United States Patent

Vincent

[19]

[11] Patent Number: 5,853,144
[45] Date of Patent: Dec. 29, 1998

[54] HELICOPTER AND METHOD FOR REDUCING VIBRATION OF A HELICOPTER FUSELAGE

[75] Inventor: Alan Henry Vincent, Somerset, United Kingdom

[73] Assignee: GKN Westland Helicopters Limited, Somerset, England

[21] Appl. No.: 751,622

[22] Filed: Nov. 18, 1996

[30] Foreign Application Priority Data

Nov. 18, 1995 [GB] United Kingdom ............... 9523651

[51] Int. Cl.⁶ ............................................. B64C 27/57
[52] U.S. Cl. ............................... 244/17.13; 244/17.27
[58] Field of Search ........................ 244/17.11, 17.13, 244/17.27, 54; 416/500; 248/550; 364/508, 509

[56] References Cited

U.S. PATENT DOCUMENTS

| | | | |
|---|---|---|---|
| 3,429,376 | 2/1969 | Hohenemser | 244/17.13 |
| 3,464,651 | 9/1969 | Lightfoot | 244/17.13 |
| 3,701,499 | 10/1972 | Schubert et al. | 244/17.27 |
| 3,938,762 | 2/1976 | Murphy | 244/17.13 |
| 4,470,121 | 9/1984 | Ebert | 416/500 |
| 4,519,743 | 5/1985 | Ham | 244/17.13 |
| 4,819,182 | 4/1989 | King et al. | 244/17.11 |
| 4,937,758 | 6/1990 | Hayden | 244/17.11 |
| 5,316,240 | 5/1994 | Girard et al. | 244/17.27 |

OTHER PUBLICATIONS

Lehmann G et al: "Automatic Vibration Reduction at a Four Bladed Hingeless Model Rotor—A Wind Tunnel Demonstration 1)" Vertica, vol. 14, No. 1, Jan. 1, 1990, pp. 69–86, XP000099608 * the whole document *.

*Primary Examiner*—Galen L. Barefoot
*Attorney, Agent, or Firm*—Larson & Taylor

[57] ABSTRACT

A helicopter structure comprises a fuselage supporting or supported by a rotating system parts of the structure being capable of relative motion at an exciting frequency, there being a plurality of actuators connected between the relatively movable parts of the structure, means continuously to oscillate the actuators at a frequency substantially corresponding to the exciting frequency, and a plurality of sensors attached to the rotating system at selected locations on the rotating system, the sensors being adapted to generate signals representative of dynamic changes at the respective selected locations, processing means adapted to process the signals from the sensors and to provide output signals for controlling the phase and magnitude of applied forces generated by the actuators and for varying the phase and magnitude characteristics of the forces so as to compensate for changes in the dynamic characteristic of the rotating system, whereby the overall level of vibration in the fuselage structure is reduced.

18 Claims, 3 Drawing Sheets

HELICOPTER AND METHOD FOR REDUCING VIBRATION OF A HELICOPTER FUSELAGE

BACKGROUND OF THE INVENTION

The dominant source of vibration in a helicopter in forward flight is that generated by the main sustaining rotor rotating system at the blade passing frequency. Forces and moments are transmitted usually through the transmission via fuselage attachments, to produce vibration in the fuselage.

Our previous U.S. Pat. No. 4,819,182 describes a method of reducing vibration of a helicopter fuselage by connecting a plurality of actuators between parts of a helicopter structure capable of relative motion at an exciting frequency, e.g. the blade passing frequency. That arrangement utilises a plurality of accelerometers attached to the helicopter fuselage at a plurality of locations, which generate signals representative of fuselage dynamic accelerations. These signals are processed by on-board processing means which provide output signals for controlling phase and magnitude of the output forces generated by the actuators between the relatively vibrating parts of the structure.

However, in an arrangement such as described in U.S. Pat. No. 4,819,182, the accelerometers and associated cabling are prone to accidental damage.

This arrangement provides advantages over other prior proposals for absorbing vibrations, which include mechanical absorbers mounted above a head of the rotor, which are effective because vibrations are "absorbed" at or closely adjacent to the source of those vibrations. However such devices require a parasitic mass of considerable magnitude which provides an unacceptable weight penalty.

SUMMARY OF THE INVENTION

According to a first aspect of the invention we provide a helicopter comprising a structure including a fuselage supporting or supported by a rotating system, parts of the structure being capable of relative motion at an exciting frequency, there being a plurality of actuators connected between the relatively movable parts of the structure, means continuously to oscillate the actuators at a frequency substantially corresponding to the exciting frequency, and a plurality of sensors attached to the rotating system at selected locations, the sensors being adapted to generate signals representative of dynamic changes at the respective selected locations during rotation, processing means adapted to process the signals from the sensors and to provide output signals for controlling the phase and magnitude of applied forces generated by the actuators and for varying the phase and magnitude characteristics of the applied forces so as to compensate for changes in the dynamic characteristic of the rotating system whereby the overall level of vibration in the fuselage is reduced.

Thus the arrangement of the present invention provides many of the advantages of the system described in our prior U.S. Pat. No. 4,819,182, but also, as the sensors are provided on the rotating system, the invention simulates the act of a head mounted mechanical absorber but with a much lower weight penalty.

Further, by providing the sensors on the rotating system, rather than on the helicopter fuselage, the sensors are able to sense vibrations occurring in the rotating system i.e. at the source of the excitation.

The sensors may be mounted on the rotating system such that the sensors and associated cabling are less prone to accidental damage than would be the case where the sensors are mounted on the fuselage.

The invention is particularly applicable where the rotating system is the main sustaining rotor of the helicopter which is the dominant source of vibrations in a helicopter fuselage.

One part of the structure which is capable of motion relative to another part of the structure may comprise one of or an assembly of more than one of an engine, a transmission, and a supporting structure of the rotating system.

Conveniently the one part of the structure is attached to the another part of the structure by plurality of resilient attachment means, such as elastomeric units.

The plurality of resilient attachment means and actuators are preferably equal in number, and if desired, each actuator may be an integrated unit with a resilient attachment.

Whereas any suitable kind of actuator which is able to apply force between the relatively movable parts of the structure may be utilised, preferably each actuator is an electro-hydraulic actuator.

In one arrangement, where the rotating system comprises a rotor head to which are affixed a plurality of rotor blades, at least one of the sensors may be mounted on the rotor head of the rotating system, although could alternatively be mounted on a rotor driveshaft, which commonly is generally vertical, or on a rotor blade which is generally horizontal.

Although different kinds of sensors may be utilised, such as strain gauges and displacement transducers, preferably the sensors comprise accelerometers which are compact, reliable and easily installed.

According to a second aspect of the invention we provide a method of reducing vibration in a helicopter structure which includes a fuselage which is supporting or supported by a rotating system, parts of the structure being capable of relative motion at an exciting frequency, the method comprising the steps of connecting a plurality of actuators between the relatively movable parts of the structure, oscillating the actuators at a frequency substantially corresponding to the exciting frequency, generating signals representative of dynamic changes at a plurality of locations on the rotating system during rotation and feeding the signals to processing means which are adapted to provide output signals for controlling the phase and magnitude of applied forces generated by the actuators and for varying the phase and magnitude characteristics of the forces so as to compensate for changes in the dynamic characteristic of the rotating system, whereby the overall level of vibration in the fuselage is reduced.

According to a third aspect of the invention we provide an apparatus for reducing vibration of a structure of a helicopter which comprises a fuselage supported by a rotating system, and in which parts of the structure are capable of relative motion at an exciting frequency, the apparatus comprising a plurality of actuators adapted to be connected between the relatively movable parts of the structure, means in use continuously to oscillate the actuators at a frequency substantially corresponding to the exciting frequency, and a plurality of sensors adapted to be attached to the rotating system at selected locations, the sensors in use, being adapted to generate signals representative of dynamic changes at the respective selected locations during rotation, the apparatus further comprising processing means adapted to process the signals from the sensors and to provide output signals for controlling the phase and magnitude of applied forces generated by the actuators and for varying the phase and magnitude characteristics of the forces so as to compensate for changes in the dynamic characteristic of the rotating system.

BRIEF DESCRIPTION OF THE DRAWINGS

The invention will now be described with reference to the accompanying drawings in which.

DESCRIPTION OF THE PREFERRED EMBODIMENTS

Figure 1:
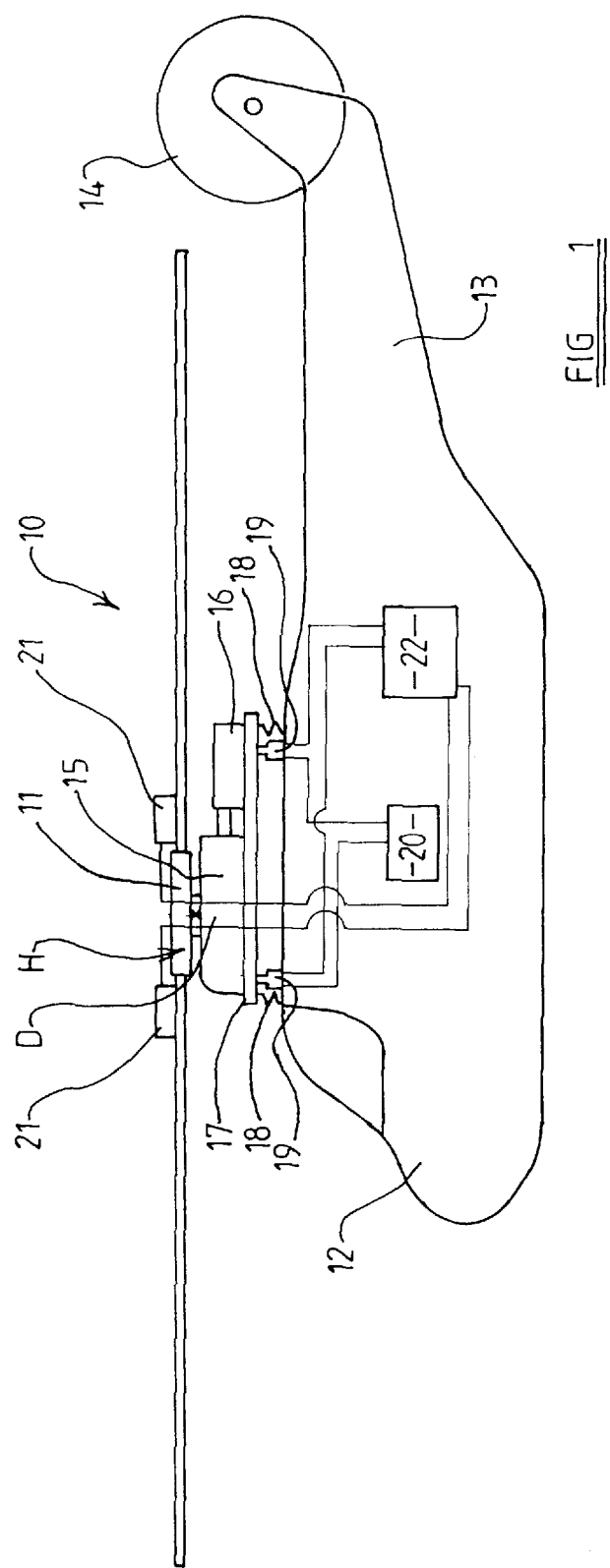
FIG. 1 is an illustrative fragmentary side elevation of a helicopter fitted with a vibration reducing apparatus according to the invention.
Figure 2:
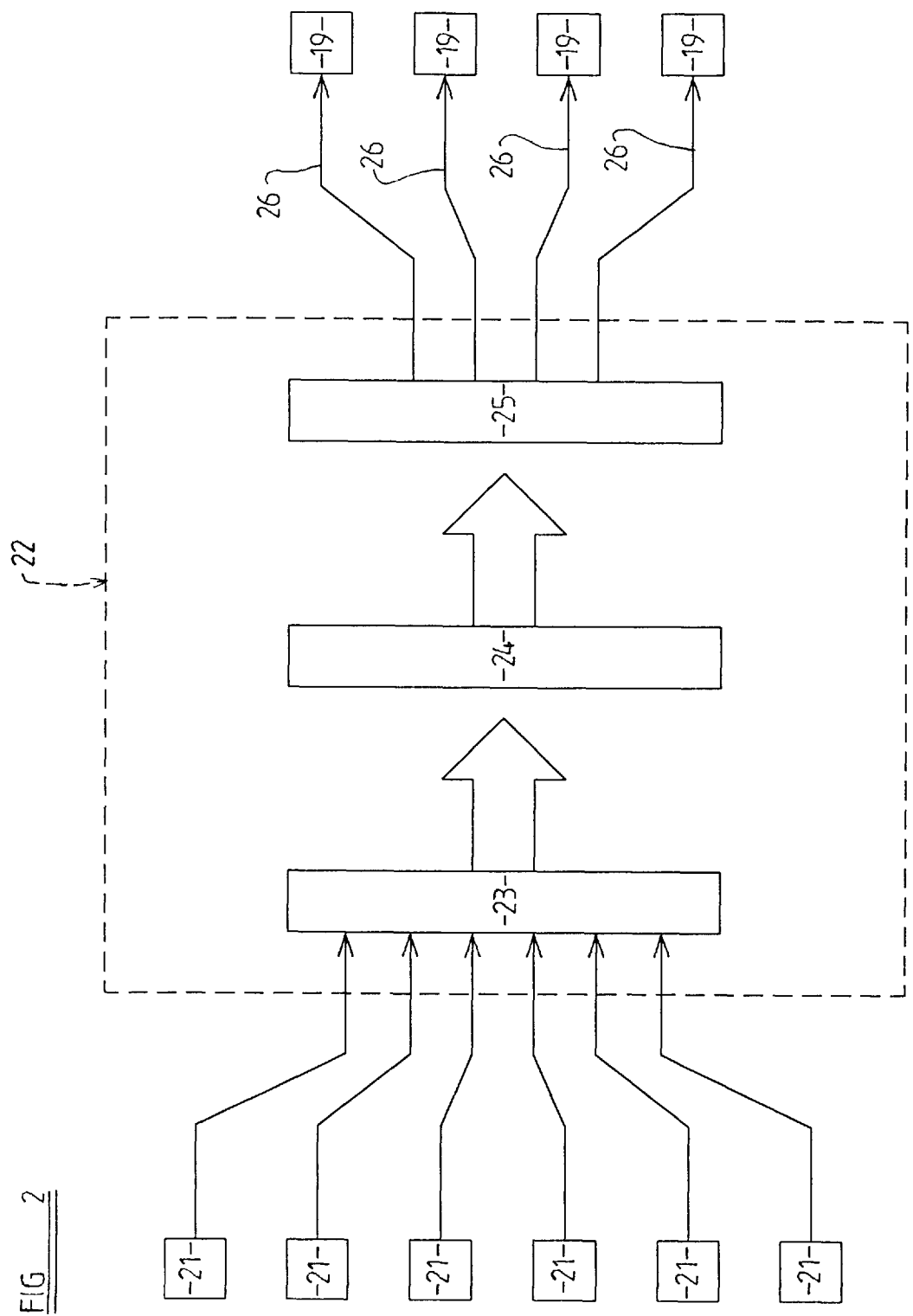
FIG. 2 is a simplified block diagram showing operation of the apparatus of FIG. 1.

Referring to FIGS. 1 and 2 of the drawings, a helicopter structure generally indicated at 10 includes a rotating system comprising a main sustaining rotor 11 supported by a supporting structure comprising a raft 17, and a helicopter fuselage 12, having rearwardly extending tail part 13 carrying an anti torque rotor 14.

The main sustaining rotor 11 is driven through a transmission (gear box) 15 by one or more engines 16, the transmission 15 and engine(s) 16 being mounted on the raft 17. The raft 17 is in this example, generally rectangular and is attached to the fuselage 12 by, in this example, four resilient attachments 18, each of which comprises an elastomeric unit 18 through which operational forces are transmitted from the raft 17 to the fuselage 12, located adjacent a corner of the rectangle.

Thus the fuselage 12 and raft 17 comprise parts of the helicopter structure which are capable of relative motion at a frequency corresponding substantially with a vibration exciting frequency. An electro-hydraulic actuator 19 is connected between the fuselage 12 and raft 17, adjacent each of the four elastomeric attachment units 18, and each actuator 19 is adapted during operation, to apply a force to the fuselage 12 that is reacted by an equal and opposite force on the raft 17.

In a preferred arrangement, the actuators 19 are each an integrated unit with a respective elastomeric attachment unit 18, such that the number of actuators 19 is equal to the number of resilient attachment units 18.

A supply of pressurised hydraulic fluid 20 is connected to each of the actuators 19.

A plurality of sensors 21, are attached at various locations to the rotor 11. In this example, four sensors 21 are provided, one on each of the four rotor blades of the rotor 11, although only two can be seen in the drawings. The sensors 21 comprise in this arrangement, accelerometers which are adapted to generate signals representative of dynamic changes at the respective selected locations as the rotor 11 rotates. In another arrangement in which the rotating system 11 has other than four rotor blades, one sensor may be provided for each rotor blade.

The accelerometers 21 are operatively connected to a processing means comprising a computer 22 which is carried in the fuselage 12, the computer 22 being adapted to provide output signals for controlling the phase and magnitude of the applied forces generated by the actuators 19 and for varying the phase and magnitude characteristics of the forces. In operation, vibratory forces are produced by the main sustaining rotor 11 due, for example, to asymmetric air flow in forward flight. Such vibratory forces arising as the rotor 11 rotates are, in the absence of any compensating systems, transmitted from the raft 17 to the fuselage 12. These forces and related moments are predominantly at the blade passing frequency and harmonics thereof, the blade passing frequency being a product of the rotational speed of the rotor 11 and the number of rotor blades.

Typically, a blade passing frequency for a four-bladed helicopter would be in the order of 21 Hz and for a five bladed helicopter, 17 Hz.

The actuators 19 are oscillated at a frequency controlled by the computer 22, so as to apply a set of forces between the fuselage 12 and raft 17 to counteract the vibrations arising in the raft 17 due to the rotation of the rotor 11. Thus where the blade passing frequency is 21 Hz, preferably the electro-hydraulic actuators 19 are continuously oscillated at a frequency of about 21 Hz.

In addition, dynamic changes occurring in the rotor 11 at the locations of the accelerometers 21 cause adjustment of the phase and magnitude of the output signals from the computer 22.

The computer 22 is adapted to analyse vibration signals received from the accelerometers 21 for example, by a digital signal processor 23 based on a discrete Fourier transform theory for rotor blade passing frequency and phase information. This measured frequency domain vibration data is then fed to a parameter estimator 24 which utilises the information to construct a linear transfer relationship for the vibration responses and the output forces from the actuators 19. The calculation of the transfer relationship estimates are based on discrete Kalman filter theory.

The resultant estimates are fed to an optimal controller 25 which calculates the optimal control forces which minimise a quadratic performance function that comprises the weighted sum of the squares of the measured vibrations and the actuator output forces and produces appropriate output signals 26 to operate the actuators 19.

This control procedure continues on a cyclic basis wherein during one cycle a constant set of oscillatory forces are applied to the fuselage 12 as the calculations are conducted.

The use of a parameter estimator 24 in the control loop of the computing apparatus 22 ensures that the phase and magnitude response characteristics of the set of output signals 26 to the actuators 19, and therefore the actuator output forces, are continuously varied to cater for changing dynamic characteristics in the rotor 11 or fuselage 12. Thus in the event of a change in the linear transfer relationship, the parameter estimator 24 detects an error between the predicted vibration level and the measured vibration level. The estimates for the relationship are adjusted accordingly and substituted into the optimal controller 25 which then calculates a new set of actuator signals 26.

Thus the method and apparatus of the invention imposes changes in the phase and magnitude of the exciting frequency oscillations of the electro-hydraulic actuators 19 simultaneously to cancel or at least substantially reduce the level of vibration transmitted from the raft 17 to the fuselage 12 thereby providing a significant improvement in the overall vibration level of the helicopter fuselage 12.

Of course, some means such as a slip ring system, would be required to transfer the signals from the accelerometers 21 which are on the rotor 11 to the computer 22 in the fuselage 12.

By virtue of the accelerometers 21 being on the rotor 11, the accelerometers 21 sense vibration at the source of excitation and so simulate an arrangement in which a parasitic mass is provided on a rotor head mounted mechanical vibration absorber, although of course the accelerometers 21 impose a much lower weight penalty.

The invention is capable of reducing vibrations transmitted from the raft 17 to the fuselage 12 caused by other mechanisms of the rotating system e.g. the higher harmonics of blade passing frequency.

Various modifications may be made without departing from the scope of the invention.

For example, the number of actuators 19 provided between the raft 17 and fuselage 12 can be varied. In the present example, the actuators 19 are oriented generally vertically (with the helicopter flying in a level plane) although may be otherwise oriented. The number of accelerometers 21 provided may be altered as is necessary but preferably the number of accelerometers 21 will not be less than the number of actuators 19. One or more or all of the accelerometers 21 may be mounted otherwise on the rotor 11 than described e.g. on a rotor head H of the rotor 11, or on a (usually generally vertically oriented) drive shaft D.

Figure 3:
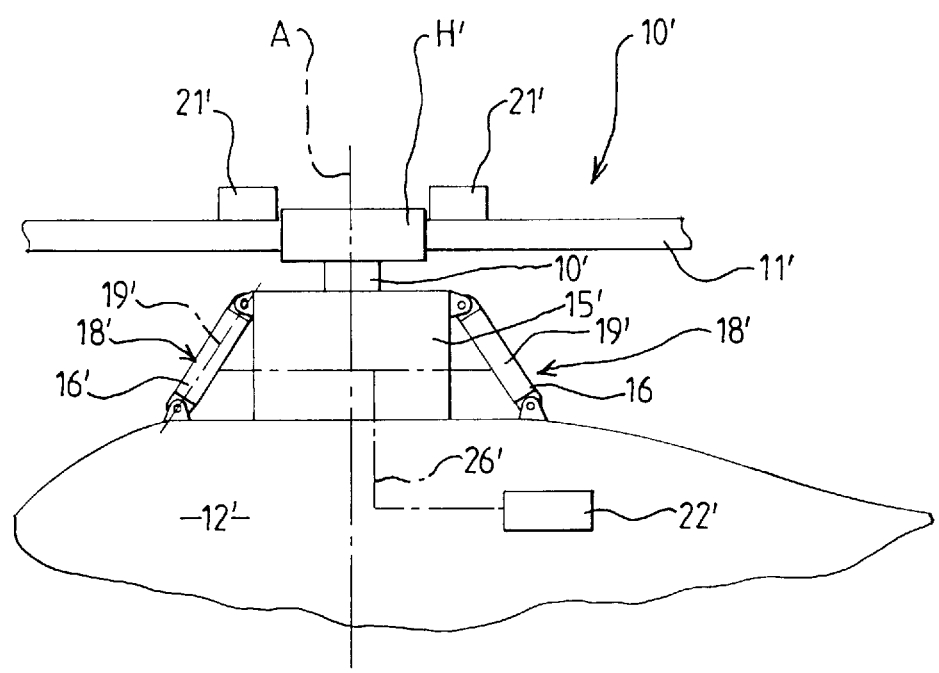
FIG. 3 is a fragmentary illustrative view similar to FIG. 1 but of an alternate embodiment.

FIG. 3 shows an alternate embodiment with similar parts of the helicopter of FIG. 1 indicated by the same reference numerals, but with a prime sign added. The FIG. 3 embodiment does not have a raft like raft 17 in FIG. 1. Rather, a helicopter structure $10^1$ comprises a fuselage $12^1$ carrying a gearbox $15^1$ which transmits drive to a rotating system comprising a main sustaining rotor $11^1$, to drive the rotor $11^1$ about an axis A. The gearbox $15^1$ is attached to the fuselage $12^1$ by means of a plurality of resilient strut assemblies $18^1$, each of which includes an actuator $19^1$. The actuators $19^1$ are, like actuators 19 in FIG. 1, of electro-hydraulic construction receiving operating signals $26^1$ from a processing means $22^1$ located in the fuselage $12^1$. The processing means $22^1$ receives input signals from sensors $21^1$ again comprise accelerometers mounted on the rotor blades of the rotor $11^1$, or otherwise on the rotor $11^1$, to vary the phase and magnitude of exciting forces, provided by the actuators $19^1$. Thus in this arrangement, the parts of the helicopter structure which are capable of relative motion comprise the gearbox $15^1$ and the fuselage $12^1$, and the resilient strut assemblies $18^1$ are arranged at about 45° to the vertical, with the helicopter in level flight.

It will be appreciated that an outer embodiment described, the invention may be utilised to reduce vibration levels in the fuselage 12 or $12^1$, by connecting actuators such as 19, $19^1$ between any parts of the helicopter structure which are capable of relative motion at an exciting frequency.

In each case, the sensors preferably comprise accelerometers 21, $21^1$, but one or more of all of the sensors could alternatively comprise for example, a strain gauge mounted on a rotor drive shaft D (FIG. 1) $D^1$ (FIG. 3) of the rotor 11, $11^1$, to measure rotor drive shaft D, $D^1$, bending for example, or displacement transducers. Accelerometers are preferred as they are compact, reliable and easily installed, whereas strain gauges may be too vulnerable to external and fatigue damage to enable them to form a viable sensor, whilst displacement transducers could be subject to wear and reliability problems in use.

If desired, one or more additional sensors may be provided on the helicopter fuselage 12, $12^1$ to generate signals representative of fuselage dynamic accelerations, such signals being fed to the computer 22, $22^1$ where they are used in the calculations which result in the output signals for controlling the phase and magnitude of the output forces generated by the actuators 19, $19^1$ between the relating vibrating parts of the structure.

Thus the actuators 19, $19^1$ output forces cater not only for changing dynamic characteristics of the rotor 11, $11^1$ but of the fuselage too.

If desired, the invention may alternatively or additionally be applied to a rotating system comprising the anti-torque rotor 14 of the helicopter 10, in which case sensing would be attached to that rotating system 14.

I claim:

1. A helicopter comprising a structure including a fuselage one of supporting and supported by a rotating system, parts of the structure being capable of relative motion at an exciting frequency, there being a plurality of actuators connected between the relatively movable parts of the structure, means continuously to oscillate the actuators at a frequency substantially corresponding to the exciting frequency, and a plurality of sensors attached to the rotating system at selected locations, the sensors being adapted to generate signals representative of dynamic changes at the respective selected locations during rotation, processing means adapted to process the signals from the sensors and to provide output signals for controlling the phase and magnitude of applied forces generated by the actuators and for varying the phase and magnitude characteristics of the applied forces so as to compensate for changes in the dynamic characteristic of the rotating system whereby the overall level of vibration in the fuselage is reduced.

2. A helicopter according to claim 1 wherein the rotating system is the main sustaining rotor.

3. A helicopter according to claim 1 wherein one part of the structure which is capable of motion relative to another part of the structure comprises at least one of an engine, a transmission, and a supporting structure of the rotating system.

4. A helicopter according to claim 3 wherein the one part of the structure is attached to the another part of the structure by a plurality of resilient attachment means.

5. A helicopter according to claim 4 wherein the plurality of resilient attachment means and actuators are equal in number.

6. A helicopter according to claim 5 wherein each actuator is an integrated unit with a resilient attachment.

7. A helicopter according to claim 1 wherein each of the actuators is an electro-hydraulic actuator.

8. A helicopter according to claim 1 wherein the rotating system comprises a rotor head to which are affixed a plurality of rotor blades, and at least one of the sensors is mounted on the rotor head.

9. A helicopter according to claim 1 wherein the rotating system comprises a rotor head to which are affixed a plurality of rotor blades, and at least one of the sensors is mounted on a rotor blade.

10. A helicopter according to claim 9 wherein a sensor is provided for each rotor blade of the rotating system.

11. A helicopter according to claim 1 wherein at least one of the sensors is mounted on a rotor drive shaft of the rotating system.

12. A helicopter according to claim 1 wherein the sensors comprise accelerometers.

13. A helicopter according to claim 1 wherein in addition to the sensors of the rotating system, at least one sensor is provided on a fuselage of the helicopter to generate signals representative of fuselage dynamic accelerations.

14. A method of reducing vibration in a helicopter structure which includes a fuselage which is one of supporting and supported by a rotating system parts of the structure being capable of relative motion at an exciting frequency, the method comprising the steps of connecting a plurality of actuators between the relatively movable parts of the structure, oscillating the actuators at a frequency substantially corresponding to the exciting frequency, generating signals representative of dynamic changes at a plurality of locations on the rotating system during rotation and feeding the signals to processing means which are adapted to provide output signals for controlling the phase and magnitude of applied forces generated by the actuators and for varying the phase and magnitude characteristics of the forces so as to compensate for changes in the dynamic characteristic of the rotating system, whereby the overall level of vibration in the fuselage is reduced.

15. A method according to claim 14 wherein the rotating system comprises a main sustaining rotor of the helicopter having a plurality of rotor blades, and the exciting frequency corresponds substantially with the rotor blade passing frequency.

16. An apparatus for reducing vibration of a structure of a helicopter which comprises a fuselage one of supporting and supported by a rotating system, and in which parts of the structure are capable of relative motion at an exciting frequency, the apparatus comprising a plurality of actuators adapted to be connected between the relatively movable parts of the structure, means in use, continuously to oscillate the actuators at a frequency substantially corresponding to the exciting frequency, and a plurality of sensors adapted to be attached to the rotating system at selected locations on the rotating system, the sensors in use, being adapted to generate signals representative of dynamic changes at the respective selected locations during rotations, the apparatus further comprising processing means adapted to process the signals from the sensors and to provide output signals for controlling the phase and magnitude of applied forces generated by the actuators and for varying the phase and magnitude characteristics of the forces so as to compensate for changes in the dynamic characteristic of the rotating system.

17. An apparatus according to claim 16 wherein the actuators are electro-hydraulic actuators.

18. An apparatus according to claim 16 wherein the sensors are accelerometers.

* * * * *